(12) United States Patent
Kase et al.

(10) Patent No.: US 7,645,542 B2
(45) Date of Patent: Jan. 12, 2010

(54) ACTIVE MATERIAL FOR POSITIVE ELECTRODE IN NON-AQUEOUS ELECTROLYTE SECONDARY BATTERY HAVING SO4 IONS

(75) Inventors: Katsuya Kase, Nihama (JP); Hirofumi Iisaka, Toyota (JP); Satoru Suzuki, Kariya (JP); Manabu Yamada, Kariya (JP)

(73) Assignees: Sumitomo Metal Mining Co., Ltd., Tokyo (JP); Toyota Jidosha Kabushiki Kaisha, Toyota-shi, Aichi-ken (JP); Denso Corporation, Kariya-shi, Aichi-ken (JP)

(*) Notice: Subject to any disclaimer, the term of this patent is extended or adjusted under 35 U.S.C. 154(b) by 110 days.

(21) Appl. No.: 10/781,624

(22) Filed: Feb. 20, 2004

(65) Prior Publication Data

US 2004/0197658 A1    Oct. 7, 2004

(30) Foreign Application Priority Data

Feb. 21, 2003    (JP) ............................. 2003-044614

(51) Int. Cl.
H01M 4/58    (2006.01)
H01M 4/00    (2006.01)
H01M 4/50    (2006.01)
H01M 4/42    (2006.01)
C01D 1/02    (2006.01)

(52) U.S. Cl. ............... 429/231.1; 429/223; 429/231.6; 429/224; 429/220; 429/229; 429/231.3; 423/594.4; 423/594.6

(58) Field of Classification Search ... 429/231.1–231.6, 429/223, 224, 220, 22; 423/594.4–594.6
See application file for complete search history.

(56) References Cited

U.S. PATENT DOCUMENTS

| | | | |
|---|---|---|---|
| 6,037,095 A | 3/2000 | Miyasaka | |
| 6,368,749 B1 | 4/2002 | Yanai et al. | |
| 7,026,068 B2 | 4/2006 | Takahashi et al. | |
| 7,459,238 B2 | 12/2008 | Takahashi et al. | |
| 2005/0271945 A1 | 12/2005 | Takahashi et al. | |

FOREIGN PATENT DOCUMENTS

| | | | |
|---|---|---|---|
| JP | 07085890 | | 3/1995 |
| JP | 08-007894 A2 | | 1/1996 |
| JP | 08-078006 A2 | | 3/1996 |
| JP | 09-213330 | | 8/1997 |
| JP | 09-245787 A2 | | 9/1997 |
| JP | 09245787 | | 9/1997 |
| JP | 11-025980 | | 1/1999 |
| JP | 11-345615 | | 1/1999 |
| JP | 11-185755 A2 | | 7/1999 |
| JP | 11-224664 A2 | | 8/1999 |
| JP | 2000-021402 A2 | | 1/2000 |
| JP | 2000-030693 A2 | | 1/2000 |
| JP | 2000021402 | | 1/2000 |
| JP | 2000021402 A | * | 1/2000 |
| JP | 2000-058053 | | 2/2000 |
| JP | 2001-076724 | | 3/2001 |
| JP | 2002-015739 A2 | | 1/2002 |
| JP | 2002-015740 A2 | | 1/2002 |
| JP | 2002-050359 | | 2/2002 |
| JP | 2004-014296 | | 1/2004 |

* cited by examiner

Primary Examiner—Mark Ruthkosky
Assistant Examiner—Karie O'Neill
(74) Attorney, Agent, or Firm—Finnegan, Henderson, Farabow, Garrett & Dunner, LLP

(57) ABSTRACT

An active material for positive electrode for a non-aqueous electrolyte secondary battery comprises a lithium-metal composite oxide that is expressed by the general formula of $Li_x(Ni_{1-y}Co_y)_{1-z}M_zO_2$ (where $0.98 \leq x \leq 1.10$, $0.05 \leq y \leq 0.4$, $0.01 \leq z \leq 0.2$, and where M is at least one metal element selected from the group of Al, Mg, Mn, Ti, Fe, Cu, Zn and Ga), and where the $SO_4$ ion content is in the range from 0.4 weight % to 2.5 weight %, and the occupancy rate of lithium found from the X-ray diffraction chart and using Rietveld analysis is 98% or greater, and the carbon amount measured by way of the high frequency heating-infrared adsorption method is 0.12 weight % or less, and that the Karl Fischer water content due to heating at 180° C. be 0.2 weight % or less.

3 Claims, No Drawings

ACTIVE MATERIAL FOR POSITIVE ELECTRODE IN NON-AQUEOUS ELECTROLYTE SECONDARY BATTERY HAVING SO4 IONS

BACKGROUND OF THE INVENTION

1. Field of the Invention

This invention relates to an active material for positive electrode in a non-aqueous electrolyte secondary battery, and to the non-aqueous electrolyte secondary battery that uses the active material, and particularly to increasing the capacity, improving the coulomb efficiency, reducing the irreversible capacity, improving the low-temperature output characteristics and improving the cycle characteristics of the non-aqueous electrolyte secondary battery.

2. Description of the Related Art

In recent years, it has become possible to manufacture lithium secondary batteries having high voltage and high energy density. Therefore, due to their compactness and high capacity characteristics, they have been used as the power supply for small portable devices such as mobilephones (cellular phones), notebook computers, camcorders, personal digital assistants (PDA) and the like, and have rapidly penetrated society. Furthermore, recently, research and development has been carried out in order to use them in automobiles, such as in hybrid cars. At present, in society, there is a demand for batteries that have even higher capacity as well as have excellent safety and output characteristics.

Lithium secondary batteries are capable of achieving high voltage and high energy density, and a lithium-cobalt composite oxide is used most often for the positive electrode for the batteries. Much research and development has been carried out for lithium secondary batteries that use this kind of lithium-cobalt composite oxide in order to obtain excellent initial capacity characteristics and cycle characteristics, and various results have been obtained and production is advancing.

However, the lithium-cobalt composite oxides use expensive cobalt compounds as one of the raw materials, which causes an increase in the cost of the positive electrode and thus an increase in the cost of the secondary battery, so there is a large demand for use of a less expensive active material in its place.

Research is being performed for using a lithium-metal composite oxide that uses a metal selected from the group of manganese and nickel as the active material for positive electrode to be used in the place of the lithium-cobalt composite oxide. Particularly, the lithium-nickel composite oxide displays the same high battery voltage as the lithium-cobalt composite oxide, and its theoretical capacity is higher than that of the lithium-cobalt composite oxide, and the raw material nickel is inexpensive and stable in supply, compared to cobalt, so there is much expectation for it as a next-generation active material for positive electrode, and much research and development is being performed.

In the past, when the lithium-nickel composite oxide obtained by a proposed manufacturing method is used for the active material for positive electrode, both the charge capacity and discharge capacity are high compared with the lithium-cobalt composite oxide, and in addition its cycle characteristics are improved. However, there is a problem in that the discharge capacity is less than the charge capacity although in the first charge and discharge only, so that the irreversible capacity, which is defined as the difference between the charge capacity and the discharge capacity is much larger than that of the lithium-cobalt composite oxide.

Moreover, when the lithium-nickel composite oxide is used in a high-temperature environment or low-temperature environment, there is a drawback in that it is comparatively easy to lose battery performance. As a secondary battery, output characteristics at high temperature or low temperature are very important characteristics when the battery is installed in a device that will be used in an environment with large temperature changes, and particularly when used in a cold areas, it is necessary that there be sufficient output characteristics at low temperatures. Therefore, when using a secondary battery that uses the lithium-nickel composite oxide in an automobile, improvement of the low-temperature output characteristics is very important.

In Japanese Patent Publication No. Tokukai Hei 8-7894, a non-aqueous lithium secondary battery that uses $LiNiO_2$ as the active material for positive electrode is proposed, where by using $LiNiO_2$ particles having a secondary particle size in the range of 3 μm to 30 μm, and where 80% or more of the pore volume has a pore radius of 50 nm or less, and where the average pore radius is in the range of 3 nm to 10 nm, so that it is possible to maintain reproducibility of the initial capacity and to secure good cycle characteristics in the active material for positive electrode.

As disclosed in Japanese Patent Publication No. Tokukai Hei 11-185755, in the case of Li $Ni_{1-x}Co_xO_2$ (0<x<1), when making an active material for positive electrode from nickel salt, cobalt salt and lithium compound, high initial discharge capacity and good cycle characteristics could be obtained in the active material for positive electrode by strictly controlling the manufacturing conditions. Also, inventions have been proposed that aim at controlling the physical properties of the particles of the active material for positive electrode to improve performance, however it cannot be said that they sufficiently solve the problems mentioned above.

It is proposed that different elements are added to the lithium-nickel composite oxide for replacement with some elements in the composite oxide in order to improve the cycle characteristics (for example, in the disclosure of Japanese Patent Publication No. Tokukai Hei 8-78006, one or more elements selected from the group of B, Al, In and Sn were added to the $Li(Ni, Co)O_2$ composite oxide). The cycle characteristics are improved, however the range for intercalation and deintercalation of the lithium ions of the active material becomes narrow, and there is a tendency for a drop to occur in the discharge capacity. And, this drop in discharge capacity becomes large particularly under heavy load conditions where the discharge current is outstandingly large, or low-temperature efficiency discharge conditions where the lithium ion mobility in the electrolyte becomes low at low temperature.

Also, in the disclosure of Japanese Patent Publication No. Tokukai 2000-30693, in the case of the lithium-metal composite oxide of a hexagonal crystal system having a layer structure and expressed as $[Li]_{3a}[Ni_{1-x-y}Co_xAl_y]_{3b}[O_2]_{6c}$ (where the subscripts added to the brackets [ ] indicate the site, and where x and y satisfy the conditions $0<x \leqq 0.20$, $0<y \leqq 0.15$), the site occupancy rate of metal ions (hereafter referred to as non-lithium ions) other than the lithium at site 3a, obtained from the Rietveld analysis results of X-ray diffraction, is 3% or less, and an active material for positive electrode can be obtained by controlling the crystallite diameter that is calculated from the particle shape and the half width of peak 003 of the X-ray diffraction pattern, so as to make a non-aqueous electrolyte secondary battery having a high initial discharge capacity and small irreversible capacity.

Also, as disclosed in Japanese Patent Publication No. Tokukai Hei 11-224664, a lithium-metal composite oxide having a structure with Co, Mn, Fe, Mg or Al uniformly mixed in solid solution into the crystal structure of the lithium-nickel composite oxide is provided, and by forming a film made of at least one water repellent material selected from the group of a polymer compound containing fluorine and ran organic silicone compound on the surface of particles of lithium-metal composite oxide, and/or the surface of the positive electrode containing such a lithium-metal composite oxide to prevent drops in battery performance due to the effect of moisture on the lithium-metal composite oxide of the positive electrode, and in addition, the process is conducted in work areas such as a dry room in which dehumidification equipment is installed, whereby it is possible to provide a lithium secondary battery that is safe, and has excellent water resistance. However, since the positive electrode or active material for it is coated with a water repellent material, the intercalation and deintercalation of the lithium ions is affected, and it is difficult to achieve highly efficient discharge characteristics.

Also related to this invention, in Japanese Patent Publication No. Tokukai Hei 9-245898, a lithium-metal composite oxide having the composition $Li_xM_yO_2$ (where x is 0.3 to 1.2, y is 0.8 to 1.2, and M is a transition metal) is provided, and by using the lithium-metal composite oxide as an active material for positive electrode for a lithium secondary battery and by controlling the amount of the sulfate radical ($SO_4$) in the composite oxide in the range of is 0.1 weight % to 2.0 weight %, corrosion of the positive electrode assembly of the lithium secondary battery is prevented while at the same time high battery capacity is maintained in the lithium secondary battery obtained. The sulfate radical ($SO_4$) is contained by adding sulfate material before sintering of the composite oxide, or from the sulfate residue which occurs when combining the lithium material with the transition metal material.

Also related to this invention, in Japanese Patent Publication No. Tokukai 2000-21402, a lithium-metal composite oxide that has a composition $Li_xM_{1-y}N_yO_{2-z}X_a$ (where M is Co or Ni, N is a transition metal element that is not the same as M or is one or more element selected from the group of the second, thirteenth, or fourteenth group of the periodic table, X is an element of halogen, and $0.2<x\leq1.2$, $0\leq y\leq0.5$, $0\leq z\leq1$ and $0\leq a\leq2z$) is provided, and a non-aqueous electrolyte or lithium secondary battery having excellent cycle life is obtained by using the lithium-metal composite oxide as the active material for positive electrode with a sulfate radical, based on inorganic and/or organic sulfate, contained in the lithium-metal composite oxide.

Also, in Japanese Patent Publications No. Tokukai 2002-15739 and No. Tokukai 2002-15740, by having at least one element from the group of Na, K, Rb, Cs, Ca, Mg, Sr and Ba coexist with sulfate ions in the lithium-metal composite oxide used for the positive electrode, a lithium secondary battery is obtained that has a high high-temperature capacity maintenance factor, and excellent cycle characteristics even when high-voltage charging is performed. Each of the publications focuses on sulfate ions in order to improve the cycle characteristics. The sulfate ions are added at an appropriate specified location in the manufacturing stage of the battery.

SUMMARY OF THE INVENTION

An object of this invention is to provide a lithium-metal composite oxide that makes possible a non-aqueous electrolyte secondary battery that has a high initial discharge capacity and low irreversible capacity, as well as has good output characteristics at high and low temperatures, and to provide that secondary battery.

DESCRIPTION OF THE PREFERRED EMBODIMENTS

The active material for positive electrode for a non-aqueous electrolyte secondary battery of this invention is a lithium-metal composite oxide that is expressed by the general formula of $Li_x(Ni_{1-y}Co_y)_{1-z}M_zO_2$ (where $0.98\leq x\leq1.10$, $0.05\leq y\leq0.4$, $0.01\leq z\leq0.2$, and where M is one or more metal element selected from the group of Al, Mg, Mn, Ti, Fe, Cu, Zn and Ga), and where the $SO_4$ ion content is in the range from 0.4 weight % to 2.5 weight %, and the occupancy rate of lithium found from the X-ray diffraction chart and using Rietveld analysis is 98% or greater.

It is preferred that the carbon amount measured by way of the high frequency heating-infrared absorption method according to "JIS Z 2615, General rules for determination of carbon in metallic materials" is 0.12 weight % or less, and that the Karl Fischer water content due to heating at 180° C. be 0.2 weight % or less.

The non-aqueous electrolyte secondary battery of this invention is made using the aforementioned active mater for positive electrode for the non-aqueous electrolyte secondary battery.

Charging and discharging of a lithium ion secondary battery or non-aqueous electrolyte secondary battery that uses a lithium-metal composite oxide as the active material for positive electrode progresses by the lithium ions leaving and entering reversibly the lithium-metal composite oxide. The lithium ions leave and enter through the interface between the surface of the lithium-metal composite oxide and the electrolyte, so the ease of mobility of the ions from the lithium-metal composite oxide to the electrolyte has a large effect on the electrical characteristics.

The charge/discharge capacity is proportional to the amount of lithium ions that leave and enter the lithium-metal composite oxide, so the ease of mobility of the lithium ions can be said to affect the charge/discharge capacity.

On the other hand, the ease of mobility of the lithium ions between the lithium-metal composite oxide and the electrolyte also affects the size of the internal resistance of the battery, and the battery having a large internal resistance is not capable of exhibiting good output characteristics, so from this aspect as well, the ease of mobility of the lithium ions is an important characteristic.

The inventors uses a surface-analysis means such as XPS to check for the existence of carbonate ions on the surface of the lithium-metal composite oxide, and they found that there was a correlation between the carbon amount in the tested lithium-metal composite oxide measured by the high frequency heating-infrared absorption method according to "JIS Z 2615, General rules for determination of carbon in metallic materials" and the amount of carbonate ions on the surface of the composite oxide. And furthermore they found that there was a close correlation between the carbon amount in the lithium-metal composite oxide measured by the high frequency heating-infrared absorption method according to "JIS Z 2615, General rules for determination of carbon in metallic materials" and the low-temperature output characteristics. On the other hand, since a positive correlation is seen between the lithium/transition metal ratio in the lithium-metal composite oxide and the amount of carbonate ions, most of the carbonate ions existing on the surface of the composite oxide are thought to exist in the form of lithium carbonate, and from actual surface analysis using XPS, the existence of lithium carbonate was confirmed. In other words, from the aforementioned two analysis results and measurement results, it was supposed that the lithium carbonate that forms on the surface of the lithium-metal composite oxide hinders the ease of mobility of the lithium ions into the lithium-metal composite oxide, and thus causes a drop in the charge/discharge capacity and the output characteristics.

The inventors completed this invention by also focusing on the amount of $SO_4$ ions contained in the lithium-metal composite oxide, and by finding that the amount of $SO_4$ ions affects the charge/discharge capacity, and also by finding that when the occupancy rate of lithium that is obtained from the X-ray diffraction chart using Rietveld analysis is low, it is not possible to estimate the charge/discharge capacity from just the amount of $SO_4$ ions. Even when $SO_4$ ions are not added intentionally, they are mixed in from a compound with a metal element such as nickel or cobalt, and the maximum content is about 5%.

This invention provides an active material for positive electrode for a non-aqueous electrolyte secondary battery. That active material for positive electrode is a lithium-metal composite oxide that makes possible a non-aqueous electrolyte secondary battery that has a high initial discharge capacity and low irreversible capacity, as well as has good output characteristics at high and low temperatures.

In the lithium-metal composite oxide expressed by the formula above, Co contributes to the improvement of the cycle characteristics. When going outside of the above range, it is not possible to obtain sufficient cycle characteristics, and in addition the maintenance factor for the capacity drops. Particularly, when the amount of added Co exceeds the range above, the drop in initial discharge capacity becomes large. Also, the increase in the amount of expensive Co is also not practical from the aspect of cost.

Also, as to the metal element M in the lithium-metal composite oxide expressed by the formula above, that is at least one metal element that is selected from the group of Al, Mg, Mn, Ti, Fe, Cu, Zn and Ga, by having it distributed uniformly in the lithium-metal composite oxide, the crystal structure of the lithium-metal composite oxide becomes stable. When the amount added is less than the range given above, stability of the crystal structure is not seen, and when the amount added exceeds the range above, the crystal structure is stable, however the drop in initial discharge capacity is large, which is not preferable.

In the case where the amount of $SO_4$ ions contained in the lithium-metal composite oxide expressed by the formula above is in the range from 0.4 weight % to 2.5 weight %, the $SO_4$ is thought to have the following effect.

The excess lithium in the lithium-metal composite oxide, or in other words, the lithium that exists somewhere other than in the lithium site in the structure given by the formula $Li_x(Ni_{1-y}Co_y)_{1-z}M_zO_2$ reacts in that situation with carbon dioxide gas or water vapor in the air, and forms a lithium carbonate or lithium hydroxide compound film on the surface of the lithium-metal composite oxide (see Equation (1), Equation (2) and Equation (3)).

This compound film remains on the surface of the lithium-metal composite oxide even in the battery assembled, and it hinders the movement of the lithium ions during charging and discharging.

On the other hand, the lithium-metal composite oxide itself reacts with water vapor, and it breaks down according to the reaction given in Equation (4) below, which causes the amount of effective active material in the secondary battery to decrease, and thus decreases the charge/discharge capacity.

$$Li_2O+CO_2 \rightarrow Li_2CO_3 \quad \text{[Equation 1]}$$

$$Li_2O+H_2O \rightarrow 2LiOH \quad \text{[Equation 2]}$$

$$2LiOH+CO_2 \rightarrow Li_2CO_3+H_2O \quad \text{[Equation 3]}$$

$$LiNiO_2+xH_2O \rightarrow xNiOOH+(1-x)LiNiO_2+xLiOH \quad \text{[Equation 4]}$$

When more than a fixed amount of $SO_4$ ions exists in the lithium-metal composite oxide, the excessive lithium reacts with the $SO_4$ ions to form lithium sulfate, which suppresses the formation of a lithium carbonate or lithium hydroxide film on the surface of the lithium-metal composite oxide. Also, the $H_2O$, which is a cause of the reaction in Equation 4, is consumed in dissolving the lithium sulfate, making it difficult for the decomposition reaction of the lithium-metal composite oxide from occurring.

In order to bring about the effect of the $SO_4$ ions, it is preferred that the carbon amount in the lithium-metal composite oxide be 0.12 weight % or less, and that the Karl Fischer water content due to heating at 180° C. be 0.2 weight % or less. When the amount exceeds this range, the drop in battery characteristics due to the compound layer on the surface becomes larger than the effect of the $SO_4$ ions and it is not possible to sufficiently realize the effect of the $SO_4$ ions, so this condition is not preferred. Also, when the Karl Fischer water content due to heating at 180° C. exceeds 0.2 weight %, similarly there is drop in the low-temperature output characteristics.

Here, the carbon amount in the lithium-metal composite oxide is measured using the high-frequency heating-infrared adsorption technique, specifically according to "JIS Z 2615, General Rule for determination of carbon in metallic materials". Also, the Karl Fischer water content due to heating at 180° C. indicates that the sample is heated to a temperature of 180° C. when measuring the water content by the Karl Fisher method, or that the sample is heated at 180° C. and then moisture content of the sample is measured with the Karl Fisher method.

Moreover, during charging or discharging of the lithium-metal composite oxide, it is well known that a decomposition reaction of the electrolyte due to localized high voltage will occur at the active points of reaction on the surface of the lithium-metal composite oxide, and that decomposition reaction of the electrolyte is known to cause a drop in the cycle characteristics or bulging of the battery during charging or discharging. It is believed that when lithium sulfate exists, the active points of reaction on the surface of the lithium-metal composite oxide are made inactive, so as to suppress the decomposition reaction of the electrolyte.

It is thought that the $SO_4$ ions exist as lithium sulfate, and it is preferred that most of the lithium sulfate exist on the surface of the particles of the lithium-metal composite oxide in order for the reaction process to be performed efficiently. It is preferred that the amount of lithium sulfate existing on the surface of the particles of the lithium-metal composite oxide be 60% or more of the total lithium sulfate contained. Furthermore, it is even more preferable that the amount be 80% or more, or yet even more preferably, 90% or more.

The amount of lithium sulfate existing on the surface of the particles of the lithium-metal composite oxide can be checked by washing the lithium-metal composite oxide with pure water, and then determining the amount of $SO_4$ ions before and after washing.

As described above, it is thought that the existence of $SO_4$ ions has the effect of suppressing the generation of lithium carbonate, which hinders the ease of movement of the lithium ions, so as to prevent a drop in the charge/discharge capacity. However, the existence of $SO_4$ ions fixes the lithium of the lithium-metal composite oxide as lithium sulfate, so there is a possibility that a large amount of $SO_4$ ions would lower the existence ratio of the lithium-metal composite oxide in the electrolyte, and as a result, would lower the charge/discharge capacity. Therefore, it is preferred that the amount of $SO_4$ ions be 2.5% or less. However, when the lithium site occupancy rate, which is found from the X-ray diffraction chart using Rietveld analysis, is low, it may not be possible to estimate the charge/discharge capacity from just the amount of $SO_4$ ions, and even when the amount of existing $SO_4$ ions is 2.5% or less, it is necessary to keep the lithium site occupancy rate at 98% or more in order to maintain the charge/discharge capacity.

Examination of the stoichiometry can be performed by X-ray diffraction using Rietveld analysis (for example, refer to R. A. Young, ed., "The Rietveld Method", Oxford University Press (1992)), where the site occupancy rate of each ion is used as an index. In the case of a compound in a hexagonal system, the sites are 3a, 3b and 6c, and when $LiNiO_2$ has a perfect stoichiometric composition, Li in site 3a, Ni in site 3b and O in site 6c each have a 100% site occupancy rate. A lithium-metal composite oxide in which the site occupancy rate of Li ions in site 3a is 98% or higher can be said to be stoichiometrically excellent.

When considering the use of lithium-metal composite oxide as an active material in a secondary battery, Li can be detached from or inserted into lithium-metal composite oxide, so the perfect structure of the crystal of lithium-metal composite oxide can be maintained even when Li deletion occurs. Therefore, in actuality, the mixture rate of non-lithium ions in site 3a, is thought to be a good method to show the stoichiometry or perfect structure of the crystal. The lithium-metal composite oxide of this invention is an active material in which part of the Ni is replaced with Co or Al in order to improve the cycle characteristics and the thermal stability, and the charge or discharge reaction of the battery using the lithium-metal composite oxide is carried out by reversible leaving and entering of Li ions in site 3a. Therefore, when other metal ions are mixed in site 3a, which is the diffusion path for the Li in the solid phase, the diffusion path is hindered, and this causes the charge or discharge characteristics of the battery to worsen. The inventors found that there was a deep relationship between the mixture rate of non-lithium ions in site 3a, which was found by powder X-ray diffraction, and the irreversible capacity, and found that the site occupancy rate of lithium ions in site 3a, obtained X-ray diffraction using Rietveld analysis, must be 98% or more.

Also, for this kind of active material for positive electrode, as a result of further study of Li diffusion, the inventors found a deep correlation between the irreversible capacity and the powder characteristics of the active material powder. The irreversible capacity is thought to be deeply related to the Li diffusion. The Li diffusion substantially comprises diffusion in the solid phase and diffusion in the electrolyte, where the diffusion in the electrolyte is thought to be faster by several figures. When the small primary particles of the active material for positive electrode collect to form secondary particles, it is possible to create a minute space between the primary particles inside the secondary particles by causing each of the primary particles to grow a little, so that electrolyte gets into that space, and so it is possible to supply Li ions to the interior of the secondary particles, formed by the primary particles, by way of the electrolyte. As a result, it is believed that the speed that the Li ions are diffused throughout the entire secondary particle is increased, which reduces the irreversible capacity. Therefore, it is preferred that the average particle size of the primary particles in the lithium-nickel composite oxide be 0.1 µm or greater, and that a plurality of such primary particles collect to form secondary particles.

Also, in the lithium-nickel composite oxide, it is known that there is a linear correlation between the average particle size of the primary particles and the crystallite diameter that is calculated from the half width at the peak 003 in the X-ray diffraction pattern, and it is preferred that the crystallite diameter that is calculated from the half width at the peak 003 in the X-ray diffraction pattern be 40 nm or more.

The $SO_4$ ions in the lithium-metal composite oxide are mostly $SO_4$ ions in compounds of nickel, cobalt and the metal element M in the raw materials, and the amount of existing $SO_4$ depends on the method of manufacturing the nickel, cobalt and metal element M compounds. In this invention, the amount of existing $SO_4$ ions is important. The existence style of the residual $SO_4$ ions is not particularly specified, however, it is preferred that most exist on the surface of the particles of the lithium-metal composite oxide. By controlling the amount of residual $SO_4$ ions in the nickel, cobalt and metal element M compounds using the control method of the embodiments described below, it is possible to control the amount of $SO_4$ ions in the lithium-metal composite oxide.

EXAMPLES

Example 1

A mixed solution of nickel sulfate and cobalt sulfate (nickel content 1.45 Moles/liter, cobalt content 0.27 Moles/liter), 150 g/liter caustic soda solution, and 25% aqueous ammonia were dripped while stirring into a reaction tank to form composite nickel hydroxide. After suction filtration of this composite nickel hydroxide was performed, 0.5 kg of caustic soda was added per 1 kg of hydroxide substance, then stirred for 5 hours and washed in alkali, after which, suction filtration was performed and then washed by spraying water until the pH of the filtered water was 9.0 or less to obtain sample A. Also, a sample B was obtained by changing the amount of caustic soda to 0.2 kg, and a sample C was obtained by changing the amount of caustic soda to 0.1 kg.

Furthermore, sodium aluminate of 4 weight % with respect to the nickel hydroxide and pure water were added to the respective samples A, B and C to make a 0.5 kg/liter slurry, after which it was neutralized to pH=9.5 using dilute sulfuric acid, and aluminum hydroxide was covered over the surface of nickel hydroxide. Then it was dried for 48 hours at 100° C. to form the composite nickel hydroxide to be used in the lithium-metal composite oxide.

The chemical compositions of the composite nickel hydroxides that were formed are shown in Table 1.

TABLE 1

| Sample | Amount of Caustic Soda per 1 kg of Hydroxides | Amount of $SO_4$ ions in Nickel Hydroxides |
|---|---|---|
| A | 0.5 kg | 0.5 weight % |
| B | 0.2 kg | 0.8 weight % |
| C | 0.1 kg | 1.2 weight % |

To 170 g of each of the composite nickel hydroxides, 80 g of commercially sold lithium hydroxide monohydrate powder was mixed in to provide a mixture, and then after each mixture was sintered in an oxygen airflow for 4 hours at 250° C., 9 hours at 450° C. and 22 hours at 730° C., the sintered body was allowed to cool to room temperature.

The sintered body were then crushed in a nitrogen atmosphere using a pin mill, and dried in a vacuum for 24 hours at 100° C., to obtain a lithium-metal composite oxide. X-ray diffraction was performed on the obtained lithium-metal composite oxide, and the desired active material for positive electrode having a hexagonal layered structure was confirmed. Also, the lithium site occupancy rate found from the X-ray diffraction chart using Rietveld analysis was 98.2% to 98.9%.

The carbon amount in the lithium-metal composite oxide was measured using the high-frequency heating-infrared absorption technique. Also, the Karl Fischer water content due to heating at 180° C. was measured using the Karl Fischer method.

As described below, batteries were made using each of the obtained active materials, and the charge and discharge capacity and the output characteristics at −30° C. were measured. The active material was made into paste by making a mixture of 90% weight of the active material powder with 5% weight of acetylene black and 5% weight PVDF (polyvinylidene fluoride), and then adding NMP (n-methylpyrolidone) to the mixture.

The paste was applied to a 20 μm thick aluminum foil such that the weight of the active material was 0.05 g/cm² after drying, then it was dried in a vacuum at 120° C., and a 1 cm diameter disc shape was punched out to form a positive electrode.

Lithium-metal was used as the negative electrode, and an equal-volume solution of ethylene carbonate (EC) and diethyl carbonate (DEC) with 1 M of $LiClO_4$ added in the solution as the supporting salt was used as the electrolyte. A 2032 type coin battery was formed in a glove box having an Ar atmosphere whose dew point was controlled to be −80° C. or less.

The manufactured battery was let to sit for 24 hours, then after the OCV became stable, a charge/discharge test was performed at 25° C. and −30° C. with the current density at the positive electrode being 0.5 mA/cm², and the cutoff voltage being 4.3-3.0 V. The irreversible capacity and Coulomb efficiency were calculated as described below. Also, the low-temperature output was calculated from the integral of the discharge curve for the first discharge at −30° C.

Irreversible capacity=Charge capacity for the first charge−Discharge capacity for the first discharge (mAh/g)

Coulomb efficiency=Discharge capacity of the first discharge/Charge capacity for the first charge× 100 (%)

The results of the measurements of the battery characteristics for this first example are shown in Table 3.

Comparative Example 1

The composite nickel hydroxide for sample D was manufactured using the same method as in example 1 except that the amount of caustic soda added during alkali washing was 2.0 kg per 1 kg of hydroxide substance.

The composite nickel hydroxide for sample E was manufactured using the same method as in example 1 except that caustic soda was not added during alkali washing.

The chemical composition of the composite nickel hydroxide that was made is as shown in Table 2.

TABLE 2

| Sample | Amount of Caustic Soda per 1 kg of Hydroxides | Amount of $SO_4$ ions in Nickel Hydroxides |
|---|---|---|
| D | 2.0 kg | 0.5 weight % |
| E | None | 2.4 weight % |

With the same method as used in Example 1, this composite nickel hydroxide was used to manufacture a lithium-nickel composite oxide. By analyzing the obtained lithium-nickel composite oxide using X-ray diffraction, it was confirmed that the desired active material for positive electrode having a hexagonal layered structure was obtained. Also, the lithium site occupancy rate found from the X-ray diffraction chart using Rietveld analysis was 97.8% to 98.7%.

The carbon amount in the lithium-metal composite oxide was measured using the high-frequency heating-infrared absorption technique. Also, the Karl Fischer water content due to heating at 180° C. was measured using the Karl Fischer method.

The charge and discharge capacities and output characteristics at −30° C. were measured using the same method as for example 1. The measurement results of the battery characteristics are shown in Table 3.

Comparative Example 2

Using the composite nickel hydroxides of samples A, B, C, D and E used in example 1 and comparative example 1, lithium-nickel composite oxides were manufactured using the same method as for example 1 except that the amount of lithium hydroxide monohydrate powder mixed in was 75 grams to obtain samples F, G, H, I and J.

By analyzing the obtained lithium-nickel composite oxide using X-ray diffraction, it was confirmed that the desired active material for positive electrode having a hexagonal layered structure was obtained. Also, the Lithium site occupancy rate found from the X-ray diffraction chart using Rietveld analysis was 97.2% to 97.9%.

The carbon amount in the lithium-metal composite oxide Was measured using the high-frequency heating-infrared absorption technique. Also, the Karl Fischer water content due to heating at 180° C. was measured using the Karl Fischer method.

The charge and discharge capacities and output at −30° C. were measured using the same method as for example 1. The measurement results of the battery characteristics are shown in Table 3.

Example 2

Using the composite nickel hydroxides of samples A, B and C obtained in example 1, lithium-metal composite oxides were manufactured using the same method as for example 1 except that crushing by the pin mill after sintering was performed in ambient air, and vacuum drying was not performed, to obtain samples K, L and M.

By analyzing the obtained lithium-metal composite oxide using X-ray diffraction, it was confirmed that the desired active material for positive electrode having a hexagonal layered structure was obtained. Also, the lithium site occupancy rate found from the X-ray diffraction chart using Rietveld analysis was 98.3% to 98.6%.

The charge and discharge capacities and output characteristics at −30° C. were measured using the same method as for example 1. The measurement results of the battery characteristics are shown in Table 3.

TABLE 3

| * | composite nickel hydroxide on raw material SO₄ ion (wt. %) | lithium-metal composite oxide SO₄ ion (wt. %) | carbon amount (wt. %) | KF (wt. %) | occupancy at lithium site (%) | initial capacity (mAh/g) | low-temp. output at −30° C. (W) |
|---|---|---|---|---|---|---|---|
| A | 0.5 | 0.6 | 0.12 | 0.03 | 98.9 | 168.5 | 3.42 |
| B | 0.8 | 0.9 | 0.11 | 0.04 | 98.6 | 167.3 | 3.68 |
| C | 1.2 | 1.5 | 0.12 | 0.03 | 98.2 | 163.9 | 3.55 |
| D | 0.2 | 0.3 | 0.12 | 0.03 | 98.7 | 159.8 | 2.79 |
| E | 2.4 | 2.6 | 0.11 | 0.05 | 97.8 | 153.7 | 3.58 |
| F | 0.5 | 0.6 | 0.10 | 0.04 | 97.6 | 159.2 | 3.82 |
| G | 0.8 | 0.9 | 0.11 | 0.05 | 97.4 | 156.8 | 3.18 |
| H | 1.2 | 1.5 | 0.11 | 0.03 | 97.3 | 157.4 | 3.24 |
| I | 0.2 | 0.3 | 0.12 | 0.04 | 97.9 | 158.7 | 2.89 |
| J | 2.4 | 2.6 | 0.12 | 0.04 | 97.2 | 156.2 | 3.19 |
| K | 0.5 | 0.6 | 0.15 | 0.25 | 98.4 | 160.2 | 2.34 |
| L | 0.8 | 1.0 | 0.17 | 0.22 | 98.6 | 161.6 | 2.27 |
| M | 1.2 | 1.5 | 0.18 | 0.24 | 98.3 | 161.1 | 2.61 |

(* = Sample, temp. = temperature, KF = Karl Fisher water content due to heating at 180° C.)

From Table 3 it can be seen that when the amount of SO₄ ions in the lithium-nickel composite oxide was 0.3% or less, both the initial capacity and low-temperature output were low, and when the amount of SO₄ ions was 2.6% or more, the low-temperature output was high, however, the lithium site occupancy rate found from the X-ray diffraction chart using Rietveld analysis was low, and the initial capacity was low.

Also, from the results of samples F to J, it was found that the initial capacity was less than 160 mAh/g, regardless of the amount of SO₄ ions, when the lithium site occupancy rate found from the X-ray diffraction chart using Rietveld analysis was less than 98%.

On the other hand; from the results of samples K to M, it can be seen that the initial capacity could be improved by having the amount of SO₄ ions be 0.4 to 2.5% and the lithium site occupancy rate found from the X-ray diffraction chart using Rietveld analysis 98% or greater. However, when the carbon amount and the water content were high, it was not possible to obtain better initial capacity or sufficient low-temperature output characteristics.

From the results of samples A to C, it was found that it is preferred that the amount of SO₄ ions in the lithium-nickel composite oxide be 0.4 weight % to 2.5 weight %, the lithium site occupancy rate found from the X-ray diffraction chart using Rietveld analysis be 98% or more, and the carbon amount and water content be low in order to obtain good initial capacity and good low-temperature output characteristics.

By using the active material for positive electrode of this invention for a non-aqueous electrolyte type secondary battery, it was possible to provide the non-aqueous electrolyte type secondary battery that has high initial discharge capacity, low irreversible capacity, and high high-temperature and low-temperature output characteristics.

What is claimed is:

1. An active material for a positive electrode of a non-aqueous electrolyte secondary battery consisting essentially of a lithium-metal composite oxide expressed by the general formula of $Li_x(Ni_{1-y}Co_y)_{1-z}M_zO_2$, in which:
   $0.98 \leq x \leq 1.10$,
   $0.05 \leq y \leq 0.4$,
   $0.01 \leq z \leq 0.2$
   and M is at least one metal element selected from the group of Al, Mg, Mn, Ti, Fe, Cu, Zn and Ga;
   wherein SO₄ ions are present in an amount ranging from 0.4 weight % to 2.5 weight %, and the occupancy rate of lithium found from the x-ray diffraction chart and using Rietveld analysis is 98% or greater.

2. The active material for a positive electrode of a non-aqueous electrolyte secondary battery of claim 1, wherein said active material contains 0.12 weight % or less of carbon, as measured by the high frequency heating-infrared absorption method, and the Karl Fischer water content due to heating at 180° C. of said active material is 0.2 weight % or less.

3. A non-aqueous electrolyte secondary battery comprising the active material for a positive electrode of one of claims 1 or 2.

* * * * *